(No Model.)
W. A. COX.
FLY TRAP FOR SCREEN DOORS.
No. 441,287. Patented Nov. 25, 1890.
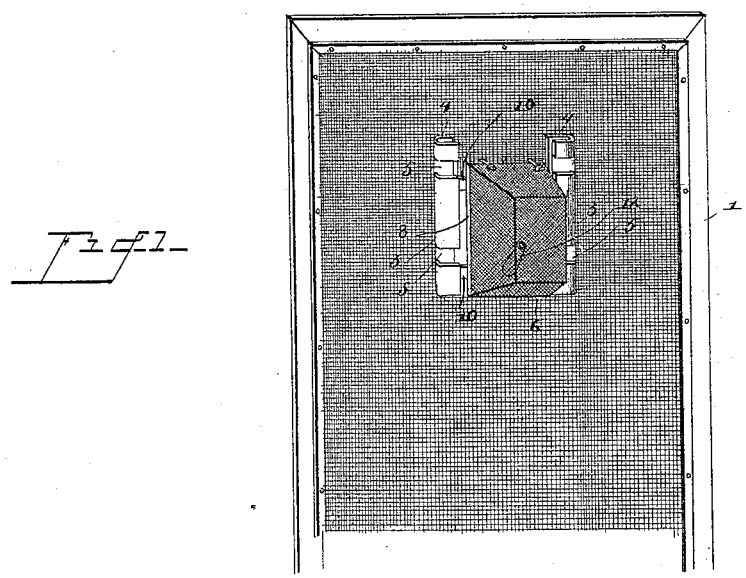
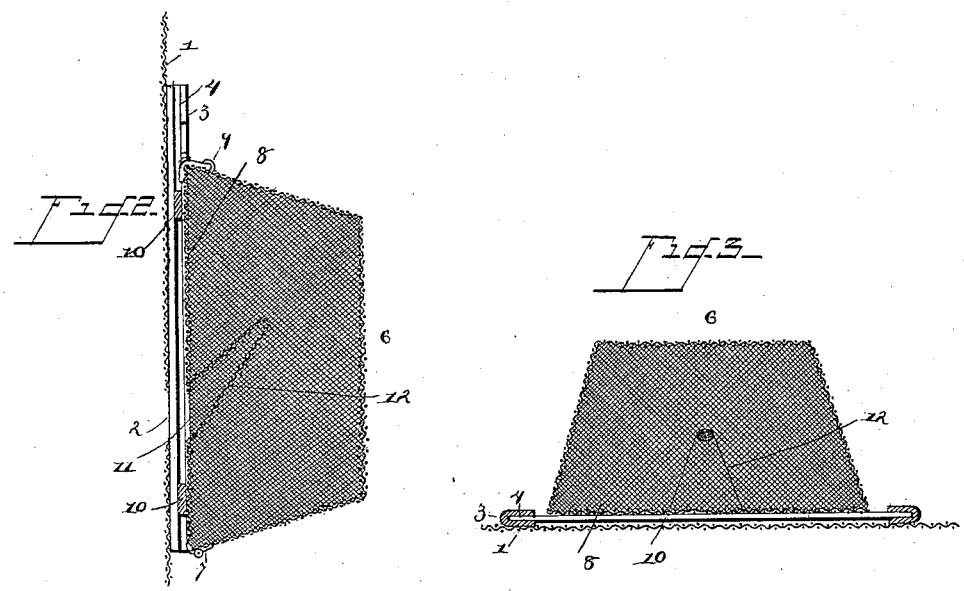
Witnesses:
Geo. E. Frich.
W. S. Duvall.
Inventor
William A. Cox
By his Attorneys,
C. A. Snow & Co.
THE NORRIS PETERS CO., PHOTO-LITHO., WASHINGTON, D. C.

UNITED STATES PATENT OFFICE.

WILLIAM A. COX, OF EUREKA, KANSAS.

FLY-TRAP FOR SCREEN-DOORS.

SPECIFICATION forming part of Letters Patent No. 441,287, dated November 25, 1890.

Application filed August 13, 1890. Serial No. 361,855. (No model.)

*To all whom it may concern:*

Be it known that I, WILLIAM A. COX, a citizen of the United States, residing at Eureka, in the county of Greenwood and State of Kansas, have invented a new and useful Fly-Trap for Screen-Doors, of which the following is a specification.

This invention has relation to fly-traps for screen-doors, the objects being to provide a cheap trap adapted to be secured to the inside of screen-doors for the purpose of entrapping the swarms of flies that congregate upon the outside of the same and which usually enter when the door is opened.

A further object of the invention is to provide means for securing the trap to the door in a detachable manner, whereby the same may be carried outside of the building and emptied of the pests.

With the above objects in view the invention consists in certain features of construction hereinafter specified, and particularly pointed out in the claims.

Referring to the drawings, Figure 1 is a perspective of the upper portion of a screen-door having a fly-trap constructed in accordance with my invention applied thereto. Fig. 2 is a vertical section of the same. Fig. 3 is a transverse section.

Like numerals of reference indicate like parts in all the figures of the drawings.

1 designates an ordinary gauze screen-door, which near its upper end is provided with a circular opening 2. The inner side of the door at opposite sides of the opening is provided with a sheet-metal strip 3, secured to the gauze, said strips being folded upon themselves to form vertical ways 4, each of said ways having recesses 5 formed therein, and the recesses of one way being transversely opposite those in the opposite way.

6 designates the fly-trap, preferably formed of wire-gauze and rectangular or box-shaped. To the lower edge of the trap there is hinged, as at 7, a gauze cover 8, removably connected to the upper edge by means of fastenings 9. The outer face of the door is provided with a pair of cross-cleats 10, the ends of which extend beyond the opposite sides of the door or cover. These cross-cleats of the cover are the same distance apart as are the pairs of recesses 5 of the ways 4, and by inserting the ends of the cleats in said recesses and lowering the trap a short distance it will be apparent that said trap is securely yet detachably secured in position upon the inner side of the door.

The door or cover 8 of the trap is provided with a circular opening 11, which when the trap is in position upon the door 1 is opposite the opening 2 of said door 1, and leading from the opening 11 upwardly into the interior of the trap is a conical (preferably gauze) passage 12.

In operation the flies congregate around the upper end of the door and are induced to pass through the passage 12 up into the trap, from which they cannot escape by reason of the conical shape of the passage, and in this manner the trap is soon filled with flies, and may be removed and emptied.

Having described my invention, what I claim is—

1. A screen-door provided with an opening and at each side of the same with ways, in combination with a trap provided with cleats projecting from its opposite sides and removably mounted in the ways, said door having an opening registering with an opening in the trap, and a passage leading from the openings into the interior of the trap, substantially as specified.

2. The combination, with a screen-door having an opening and upon its inner side provided with opposite vertical ways having recesses, of a trap-box, the front face of which is provided with opposite transverse cleats, the ends of which extend beyond the box and are located a distance apart agreeing with said ways, said box having an opening registering with that of the door, and a conical tube extending from the opening into that of the box, substantially as specified.

3. The combination, with a screen-door having an opening, of a trap removably secured thereto and having a removable lid and means for securing the same in position upon the trap, said lid having an opening agreeing with that in the door, and a conical passage leading from the opening into the trap, substantially as specified.

4. The combination, with a door provided near its upper end with an opening and opposite sheet-metal strips secured to the door at each side of the opening, said strips being bent upon themselves to form ways, each of which is provided with a pair of recesses, of a trap or box having a hinged cover provided with an opening opposite that in the door, a conical passage leading from the opening to the interior of the trap, and a pair of cleats secured to the outer surface of the cover and having their ends extending beyond the trap and adapted to pass through the openings or recesses and into the ways, substantially as specified.

In testimony that I claim the foregoing as my own I have hereto affixed my signature in presence of two witnesses.

WILLIAM A. COX.

Witnesses:
T. J. GORDON,
J. F. HOLLEMAN.